（12） United States Patent
Jan et al.

(10) Patent No.: US 9,618,022 B2
(45) Date of Patent: Apr. 11, 2017

(54) CLAMP CONNECTOR

(71) Applicant: UNITED TECHNOLOGIES CORPORATION, Farmington, CT (US)

(72) Inventors: Shihming Jan, Solana Beach, CA (US); Louis Kasden, San Diego, CA (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 21 days.

(21) Appl. No.: 14/313,571

(22) Filed: Jun. 24, 2014

(65) Prior Publication Data

US 2015/0000089 A1 Jan. 1, 2015

Related U.S. Application Data

(60) Provisional application No. 61/839,392, filed on Jun. 26, 2013.

(51) Int. Cl.
*F16B 2/12* (2006.01)
*F16B 5/00* (2006.01)
*F02K 1/80* (2006.01)

(52) U.S. Cl.
CPC .................. *F16B 2/12* (2013.01); *F02K 1/80* (2013.01); *F16B 5/0068* (2013.01); *Y10T 24/44966* (2015.01); *Y10T 403/4674* (2015.01)

(58) Field of Classification Search
CPC ...... F16B 2/02; F16B 2/14; F16B 2/12; F16B 5/0004; F16B 5/0088; F16B 5/0032; F16B 5/004; F16B 5/0028; F16B 5/0068; F16B 5/0072; F16B 5/06; F16B 5/0607; F16B 5/0692; F16B 5/0621; F16B 5/0635; F16B 2005/0678; Y10T 403/63; Y10T 403/635; Y10T 403/76; Y10T 403/5793

See application file for complete search history.

(56) References Cited

U.S. PATENT DOCUMENTS 6,991,399 B2 * 1/2006 Park ...................... E04B 1/2403
403/187

* cited by examiner

*Primary Examiner* — Matthieu Setliff
(74) *Attorney, Agent, or Firm* — Cantor Colburn LLP

(57) ABSTRACT

A clamp connector includes a first clamping member configured to apply a clamping force to a material, the first clamping member having a first portion including a first and second cam surfaces, a first cammed body adjacent the first cam surface, and a second cammed body adjacent the second cam surface. A second clamping member is configured to apply a clamping force to the material. The second clamping member having a second portion including a third and fourth cam surfaces, a third cammed body adjacent the third cam surface, and a fourth cammed body adjacent the fourth cam surface. When each cam surface is forced against the adjacent cammed body a clamping force between the first clamping member and the second clamping member is increased.

23 Claims, 2 Drawing Sheets

CLAMP CONNECTOR

CROSS REFERENCE TO RELATED APPLICATION

This application claims the benefit of and incorporates by reference herein the disclosure of U.S. Ser. No. 61/839,392, filed Jun. 26, 2013.

TECHNICAL FIELD OF THE DISCLOSURE

The present disclosure is generally related to connectors and, more specifically, to a clamp connector.

BACKGROUND OF THE DISCLOSURE

There are many applications in which it is desired to connect together two edges of adjoining portions of material. As one non-limiting example, many gas turbine engines utilize silencers through which exhaust gas is routed. A typical silencer construction comprises metal fibers and wire woven into a grid sheet and arranged in a cylindrical shape. The exhaust gas flows through the silencer as it travels down the exhaust path. Interaction between the gas and the pores of the grid convert sound energy to heat. Additionally, the sound wave associated with the exhaust flow bounces off of the grid and cancels a portion of the sound energy remaining in the exhaust flow, thus reducing the noise produced by the engine when the exhaust gas exits the engine.

To construct the silencer, a sheet of metal grid material is rolled into a cylinder with the edges adjoining one another, and a seam is created by welding the two edges of the material together along the length of the cylinder. It has been determined that this seam may become a location of early crack formation in the silencer during use, as the welding process deteriorates the metal grid material's oxidation resistance and mechanical properties. The crack formation can lead to the separation of the joint and reduces the silencer performance.

Improvements in systems for joining two edges of material are therefore needed in the art. The present disclosure is related to a system for joining two edges of adjoining portions of a material. The presently disclosed embodiments will find applicability to joining edges of metal grid material used in the construction of exhaust gas silencers in gas turbine engines. The presently disclosed embodiments will also find applicability in other applications where two edges of adjoining portions of any material are to be joined together.

SUMMARY OF THE DISCLOSURE

In one embodiment, a clamp connector having a longitudinal axis defining a longitudinal plane containing the longitudinal axis and a transverse plane containing the longitudinal axis, the transverse axis perpendicular to the longitudinal plane is disclosed, the clamp connector comprising: a first containing member including portions positioned on either side of the longitudinal plane, a first containing member first cam surface and a first containing member second cam surface; a first clamping member adjacent the first containing member, the first clamping member including a first clamping member cam surface; a second clamping member adjacent the first containing member, the second clamping member including a second clamping member cam surface; a second containing member including portions positioned on either side of the longitudinal plane, a second containing member first cam surface and a second containing member second cam surface; a third clamping member adjacent the second containing member, the third clamping member including a third clamping member cam surface; a fourth clamping member adjacent the second containing member, the fourth clamping member including a fourth clamping member cam surface; wherein the first containing member first cam surface, the first clamping member cam surface, the second containing member second cam surface, and the third clamping member cam surface each slope in a first direction; and wherein the first containing member second cam surface, the second clamping member cam surface, the second containing member first cam surface, and the third clamping member cam surface each slope in a second direction opposite the first direction.

In another embodiment, a clamp connector having a longitudinal axis defining a longitudinal plane containing the longitudinal axis and a transverse plane containing the longitudinal axis, the transverse axis perpendicular to the longitudinal plane is disclosed, the clamp connector comprising: a first containing member positioned on either side of the longitudinal plane, the first containing member including a first containing member first cam surface and a first containing member second cam surface; a first clamping member including a first clamping member cam surface positioned adjacent the first containing member first cam surface, wherein a thickness of the first clamping member decreases with increasing distance from the longitudinal plane; a second clamping member including a second clamping member cam surface positioned adjacent the first containing member second cam surface, wherein a thickness of the second clamping member decreases with increasing distance from the longitudinal plane; a second containing member positioned on either side of the longitudinal plane, the second containing member including a second containing member first cam surface and a second containing member second cam surface; a third clamping member including a third clamping member cam surface positioned adjacent the second containing member first cam surface, wherein a thickness of the third clamping member decreases with increasing distance from the longitudinal plane; and a fourth clamping member including a fourth clamping member cam surface positioned adjacent the second containing member second cam surface, wherein a thickness of the fourth clamping member decreases with increasing distance from the longitudinal plane.

In another embodiment, a clamp connector is disclosed, comprising: a first clamping member configured to apply a clamping force to a material, the first clamping member comprising a first portion including a first and second cam surfaces, a first cammed body adjacent the first cam surface, and a second cammed body adjacent the second cam surface; and a second clamping member configured to apply a clamping force to the material, the second clamping member comprising a second portion including a third and fourth cam surfaces, a third cammed body adjacent the third cam surface, and a fourth cammed body adjacent the fourth cam surface; wherein when each cam surface is forced against the adjacent cammed body a clamping force between the first clamping member and the second clamping member is increased.

Other embodiments are also disclosed.

BRIEF DESCRIPTION OF THE DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein.

DETAILED DESCRIPTION OF THE DISCLOSED EMBODIMENTS

For the purposes of promoting an understanding of the principles of the invention, reference will now be made to certain embodiments and specific language will be used to describe the same. It will nevertheless be understood that no limitation of the scope of the invention is thereby intended, and alterations and modifications in the illustrated device, and further applications of the principles of the invention as illustrated therein are herein contemplated as would normally occur to one skilled in the art to which the invention relates.

The present disclosure is applicable to all applications where two adjoining portions of material are to be joined together. A clamp connector couples the two adjoining portions of material together such that increased clamping pressure is applied in response to forces attempting to separate the two adjoining portions of material. In an embodiment, two adjoining edges of a metal grid material are joined together in a silencer of a gas turbine engine.

Figure 1:
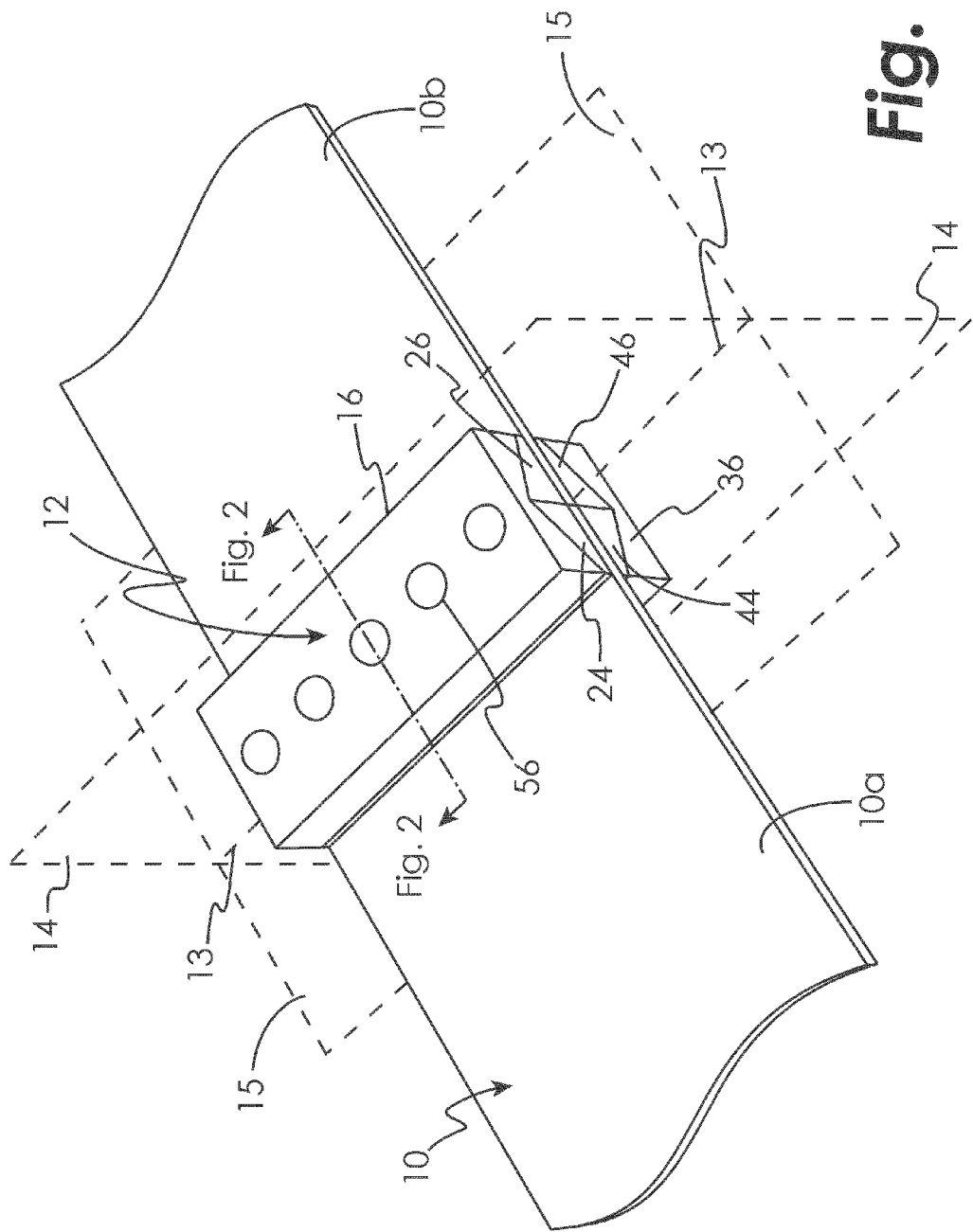
FIG. 1 is a perspective view of a clamp connector according to an embodiment joining two portions of a material.
Figure 2:
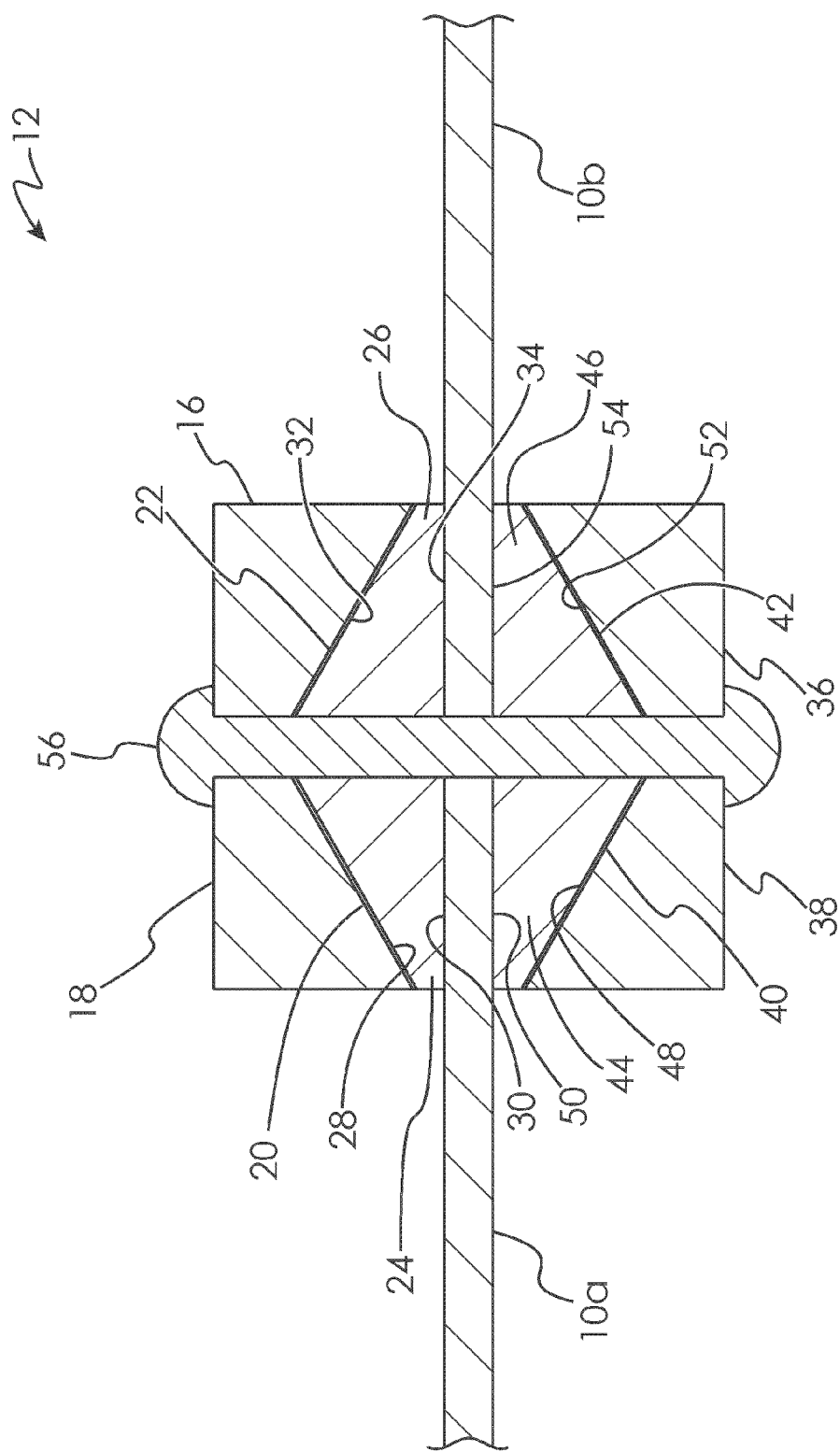
FIG. 2 is a schematic cross-section of a clamp connector according to an embodiment.

With reference to FIGS. 1 and 2, two adjoining edges of portions 10a and 10b of a material 10 are joined together using a clamp connector 12 of an embodiment. The joined seam may comprise adjoining edges of portions 10a and 10b of the same piece of material 10 formed into a cylinder or other shape, or may comprise adjoining edges of portions 10a and 10b of two separate pieces of material 10. The material may exhibit any physical characteristic, including being flexible, rigid, thin, thick, uniform, and/or non-uniform, to name just a few non-limiting examples. In general, any material 10 that will fit within the clamp connector 12 may be joined. The clamp connector 12 has a longitudinal axis 13 that is substantially coextensive with the two adjoining edges of the material 10 positioned within the clamp connector 12 when in use. The longitudinal axis 13 lies within a longitudinal plane 14 that is substantially perpendicular to the material 10 positioned within the clamp connector 12 when in use. The longitudinal axis 13 also lies within a transverse plane 15 that is substantially perpendicular to the longitudinal plane 14. In applications where material 10 is thin and substantially flat, material 10 positioned within the clamp connector 12 when in use will be positioned substantially in the transverse plane 15.

The clamp connector 12 comprises a first containing member 16 that includes portions positioned on either side of a longitudinal plane 14. The first containing member 16 includes an outer surface 18, a first cam surface 20 and a second cam surface 22 (FIG. 2). The cam surfaces 20 and 22 are positioned closer to the transverse plane 15 with increasing distance from the longitudinal plane 14. In an embodiment, a thickness of the first containing member 16 increases with increasing distance from the longitudinal plane 14.

Positioned between the first containing member 16 and the portions 10a and 10b of the material 10 (when the clamp connector 12 is in use) are a first clamping member 24 and a second clamping member 26, each comprising a cammed body (i.e., a body with a cam surface). First clamping member 24 includes a cam surface 28 adjacent to or in contact with cam surface 20, and a clamping surface 30 adjacent to or in contact with the material 10. Second clamping member 26 includes a cam surface 32 adjacent to or in contact with cam surface 22, and a clamping surface 34 adjacent to or in contact with the material 10. First clamping member 24 is positioned on a first side of the longitudinal plane 14, while second clamping member 26 is positioned on a second side of the longitudinal plane 14. The cam surfaces 28 and 32 are positioned closer to the transverse plane 15 with increasing distance from the longitudinal plane 14. In an embodiment, a thickness of each clamping member 24 and 26 decreases with increasing distance from the longitudinal plane 14.

The clamp connector 12 further comprises a second containing member 36 that includes portions positioned on either side of a longitudinal plane 14. The second containing member 36 includes an outer surface 38, a first cam surface 40 and a second cam surface 42. The cam surfaces 40 and 42 are positioned closer to the transverse plane 15 with increasing distance from the longitudinal plane 14. In an embodiment, a thickness of the first containing member 36 increases with increasing distance from the longitudinal plane 14.

Positioned between the second containing member 36 and portions 10a and 10b of the material 10 (when the clamp connector 12 is in use) are a third clamping member 44 and a fourth clamping member 46. Third clamping member 44 includes a cam surface 48 adjacent to or in contact with cam surface 40, and a clamping surface 50 adjacent to or in contact with the material 10. Fourth clamping member 46 includes a cam surface 52 adjacent to or in contact with cam surface 42, and a clamping surface 54 adjacent to or in contact with the material 10. Third clamping member 44 is positioned on a first side of the longitudinal plane 14, while fourth clamping member 46 is positioned on a second side of the longitudinal plane 14. The cam surfaces 48 and 52 are positioned closer to the transverse plane 15 with increasing distance from the longitudinal plane 14. In an embodiment, a thickness of each clamping member 44 and 46 decreases with increasing distance from the longitudinal plane 14.

The cam surfaces 20, 22, 28, 32, 40, 42, 48 and 52 each exhibit a slope (rise/run) with respect to the transverse plane 15. The cam surfaces 20, 28, 42 and 52 exhibit a first slope in a first direction, while cam surfaces 22, 32, 40 and 48 exhibit a second slope in a second direction, the second direction being opposite the first direction, meaning that it will have an opposite sign (positive or negative) but may or may not have the same slope magnitude. In an embodiment, all of the cam surfaces have the same slope magnitude. In another embodiment, each adjacent pair of cam surfaces (e.g., 20 and 28) have the same slope magnitude and sign, but other adjacent pairs of cam surfaces may have different slope magnitudes.

The first containing member 16 and the second containing member 36 are prevented from moving away from one another by any desired device or devices. In an embodiment, one or more fasteners 56 may be used to prevent first containing member 16 from moving away from second containing member 36. Fastener 56 may be a rivet, screw or bolt, to name just three non-limiting examples. The first containing member 16 may also be prevented from moving away from the second containing member 36 by an exterior clamping force, such as by means of a c-clamp (not shown), to name just one non-limiting example. It will be appreciated from the present disclosure that the means used to prevent the first containing member 16 from moving away from the second containing member 36 is not critical.

The first containing member 16 and the second containing member 36 capture the first clamping member 24, second clamping member 26, third clamping member 44 and fourth clamping member 46, as well as the adjoining edges of portions 10a and 10b of the material 10, within the space between first containing member 16 and second containing member 36. The at least one fastener 56 (or other mechanism used to urge first containing member 16 and second containing member 36 toward one another) causes a clamping force to be applied to the adjoining portions 10a and 10b of the material 10, thereby clamping the adjoining portions 10a and 10b of the material 10 within the clamp connector 12. In some embodiments, one or more of the first clamping member 24, second clamping member 26, third clamping member 44 and fourth clamping member 46 is/are mechanically and/or adhesively coupled to the portions 10a and/or 10b of the material 10, while in other embodiments no such mechanical and/or adhesive coupling is employed.

If forces are applied to portions 10a and/or 10b of the material 10 to pull the portions 10a and/or 10b of the material 10 on one side of the longitudinal plane 14 away from the portions 10b and/or 10a of the material 10 on the other side of the longitudinal plane 14, such forces will cause the first clamping member 24, second clamping member 26, third clamping member 44 and fourth clamping member 46 to also be urged away from the longitudinal plane 14. When this happens, cam surface pairs 20/28, 22/32, 40/48 and 42/52 cause clamping surfaces 30, 34, 50 and 54 to clamp down harder against the adjacent material 10 as the first clamping member 24 and the second clamping member 26 move farther away from the first containing member 16 and the third clamping member 44 and the fourth clamping member move farther away from the second containing member 36. Thus, the more the portions 10a and 10b of the material 10 try to separate, the greater the clamping force applied by the clamp connector 12 to prevent such separation.

The clamp connector 12 therefore securely joins the adjoining edges of the portions 10a and 10b of material 10. In applications such as joining the edges of the metal grid material silencer used in gas turbine engines, the clamp connector 12 securely joins the adjoining edges of the material 10 without the requirement of welding these edges together. Consequently, the original oxidation resistance and mechanical strength of the material 10 is preserved.

While the invention has been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed:

1. A clamp connector having a longitudinal axis defining a longitudinal plane containing the longitudinal axis and a transverse plane containing the longitudinal axis, the transverse axis perpendicular to the longitudinal plane, the clamp connector comprising:
   a first containing member including portions positioned on either side of the longitudinal plane, a first containing member first cam surface and a first containing member second cam surface;
   a first clamping member adjacent the first containing member, the first clamping member including a first clamping member cam surface;
   a second clamping member adjacent the first containing member, the second clamping member including a second clamping member cam surface;
   a second containing member including portions positioned on either side of the longitudinal plane, a second containing member first cam surface and a second containing member second cam surface;
   a third clamping member adjacent the second containing member, the third clamping member including a third clamping member cam surface;
   a fourth clamping member adjacent the second containing member, the fourth clamping member including a fourth clamping member cam surface;
   a first material portion disposed between the first and third clamping members, the first material portion having a first portion edge defining a laterally inboardmost extent of the first material portion, the first clamping member and the third clamping member each having a maximum thickness at the first portion edge of the first material portion; and
   a second material portion disposed between the second and fourth clamping members, the second material portion having a second portion edge defining a laterally inboardmost extent of the second material portion, the second clamping member and the fourth clamping member each having a maximum thickness at the second portion edge of the second material portion;
   wherein the first containing member first cam surface, the first clamping member cam surface, the second containing member second cam surface, and the third clamping member cam surface each slope in a first direction; and
   wherein the first containing member second cam surface, the second clamping member cam surface, the second containing member first cam surface, and the third clamping member cam surface each slope in a second direction opposite the first direction;
   wherein the first clamping member abuts the second clamping member at the longitudinal plane and the third clamping member abuts the fourth clamping member at the longitudinal plane.

2. The clamp connector of claim 1, wherein a first magnitude of the first slope is equal to a second magnitude of the second slope.

3. The clamp connector of claim 1, wherein the first containing member first cam surface, the first containing member second cam surface, the first clamping member cam surface, the second clamping member cam surface, the second containing member first cam surface, the second containing member second cam surface, the third clamping member cam surface, and the fourth clamping member cam surface are each positioned closer to the transverse plane with increasing distance from the longitudinal plane.

4. The clamp connector of claim 1, wherein the first material portion and the second material portion comprise portions of the same piece of material.

5. The clamp connector of claim 4, wherein the single piece of material comprises a metal grid material.

6. The clamp connector of claim 5, wherein the single piece of material forms part of an exhaust gas silencer.

7. The clamp connector of claim 1, wherein the first and second portions of material are substantially flat.

8. The clamp connector of claim 1, wherein:
the first and second clamping members are in contact with the first containing member; and
the third and fourth clamping members are in contact with the second containing member.

9. The clamp connector of claim 1, further comprising at least one fastener coupling the first containing member to the second containing member.

10. A clamp connector having a longitudinal axis defining a longitudinal plane containing the longitudinal axis and a transverse plane containing the longitudinal axis, the transverse axis perpendicular to the longitudinal plane, the clamp connector comprising:
a first containing member positioned on either side of the longitudinal plane, the first containing member including a first containing member first cam surface and a first containing member second cam surface;
a first clamping member including a first clamping member cam surface positioned adjacent the first containing member first cam surface, wherein a thickness of the first clamping member decreases with increasing distance from the longitudinal plane;
a second clamping member including a second clamping member cam surface positioned adjacent the first containing member second cam surface, wherein a thickness of the second clamping member decreases with increasing distance from the longitudinal plane;
a second containing member positioned on either side of the longitudinal plane, the second containing member including a second containing member first cam surface and a second containing member second cam surface;
a third clamping member including a third clamping member cam surface positioned adjacent the second containing member first cam surface, wherein a thickness of the third clamping member decreases with increasing distance from the longitudinal plane;
a fourth clamping member including a fourth clamping member cam surface positioned adjacent the second containing member second cam surface, wherein a thickness of the fourth clamping member decreases with increasing distance from the longitudinal plane;
a first material portion disposed between the first and third clamping members, the first material portion having a first portion edge defining a laterally inboardmost extent of the first material portion, the first clamping member and the third clamping member each having a maximum thickness at the first portion edge of the first material portion; and
a second material portion disposed between the second and fourth clamping members, the second material portion having a second portion edge defining a laterally inboardmost extent of the second material portion, the second clamping member and the fourth clamping member each having a maximum thickness at the second portion edge of the second material portion;
wherein the first clamping member abuts the second clamping member at the longitudinal plane and the third clamping member abuts the fourth clamping member at the longitudinal plane.

11. The clamp connector of claim 10, wherein the first containing member first cam surface, the first containing member second cam surface, the first clamping member cam surface, the second clamping member cam surface, the second containing member first cam surface, the second containing member second cam surface, the third clamping member cam surface, and the fourth clamping member cam surface are each positioned closer to the transverse plane with increasing distance from the longitudinal plane.

12. The clamp connector of claim 10, wherein the first material portion and the second material portion comprise portions of the same piece of material.

13. The clamp connector of claim 12, wherein the single piece of material comprises a metal grid material.

14. The clamp connector of claim 12, wherein the single piece of material forms part of an exhaust gas silencer.

15. The clamp connector of claim 10, wherein:
the first and second clamping members are in contact with the first containing member; and
the third and fourth clamping members are in contact with the second containing member.

16. The clamp connector of claim 10, further comprising at least one fastener coupling the first containing member to the second containing member.

17. A clamp connector comprising:
a first clamping member configured to apply a clamping force to a material, the first clamping member comprising a first portion including a first and second cam surfaces, a first cammed body adjacent the first cam surface, and a second cammed body adjacent the second cam surface; and
a second clamping member configured to apply a clamping force to the material, the second clamping member comprising a second portion including a third and fourth cam surfaces, a third cammed body adjacent the third cam surface, and a fourth cammed body adjacent the fourth cam surface;
a first material portion of the material disposed between the first and third cammed bodies, the first material portion having a first portion edge defining a laterally inboardmost extent of the first material portion, the first cammed body and the third cammed body each having a maximum thickness at the first portion edge of the first material portion; and
a second material portion of the material disposed between the second and fourth cammed bodies, the second material portion having a second portion edge defining a laterally inboardmost extent of the second material portion, the second cammed body and the fourth cammed body each having a maximum thickness at the second portion edge of the second material portion;
wherein when each cam surface is forced against the adjacent cammed body a clamping force between the first clamping member and the second clamping member is increased;
wherein the first clamping member abuts the second clamping member at the longitudinal plane and the third clamping member abuts the fourth clamping member.

18. The clamp connector of claim 17, further comprising:
a first material portion disposed between the first and third cammed bodies; and
a second material portion disposed between the second and fourth cammed bodies.

19. The clamp connector of claim 18, wherein the first material portion and the second material portion comprise portions of the same piece of material.

20. The clamp connector of claim 19, wherein the single piece of material comprises a metal grid material.

21. The clamp connector of claim 20, wherein the single piece of material forms part of an exhaust gas silencer.

22. The clamp connector of claim 17, wherein:
the first cammed body is in contact with the first cam surface;
the second cammed body is in contact with the second cam surface;
the third cammed body is in contact with the third cam surface; and
the fourth cammed body is in contact with the fourth cam surface.

23. The clamp connector of claim 17, further comprising at least one fastener coupling the first clamping member to the second clamping member.

* * * * *